United States Patent
Weng et al.

(10) Patent No.: US 10,494,921 B2
(45) Date of Patent: Dec. 3, 2019

(54) METHODS FOR INTERPRETATION OF DOWNHOLE FLOW MEASUREMENT DURING WELLBORE TREATMENTS

(75) Inventors: Xiaowei Weng, Katy, TX (US);
Philippe M. J. Tardy, Hellerup (DK);
Douglas Pipchuk, Calgary (CA); Rex Burgos, Richmond, TX (US); Hubertus V. Thomeer, Houston, TX (US);
Robert Van Kuijk, Le Plessis Robinson (FR); Tullio Moscato, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 822 days.

(21) Appl. No.: 14/363,268

(22) PCT Filed: Dec. 6, 2011

(86) PCT No.: PCT/US2011/053636
§ 371 (c)(1),
(2), (4) Date: Feb. 16, 2015

(87) PCT Pub. No.: WO2013/085479
PCT Pub. Date: Jun. 13, 2013

(65) Prior Publication Data
US 2015/0233239 A1 Aug. 20, 2015

(51) Int. Cl.
*E21B 49/08* (2006.01)
*E21B 49/00* (2006.01)
(Continued)

(52) U.S. Cl.
CPC ............ *E21B 49/008* (2013.01); *E21B 47/06* (2013.01); *E21B 47/09* (2013.01); *E21B 47/10* (2013.01); *G01F 1/00* (2013.01)

(58) Field of Classification Search
CPC ......... E21B 49/008; E21B 49/06; E21B 47/09
(Continued)

(56) References Cited

U.S. PATENT DOCUMENTS

| 4,051,718 A | 10/1977 | Meckl et al. |
| 4,233,508 A | 11/1980 | Arnold |

(Continued)

FOREIGN PATENT DOCUMENTS

WO 1994025732 A1 11/1994

OTHER PUBLICATIONS

Setari_2000 (Not on the Calculation of PWRI Well Injective Index; TAURUS Reservoir Solutions, Dec. 2000).*

(Continued)

*Primary Examiner* — Brian S Cook

(57) ABSTRACT

A method for determining a flow distribution in a formation having a wellbore formed therein comprises the steps of positioning a bottomhole assembly in a wellbore, the assembly including an injection port for dispensing a fluid, a first sensor disposed upwell from the injection port, and a second sensor disposed downwell from the injection port, wherein each of the sensors generates a feedback signal representing a flow rate of the fluid in a portion of the wellbore, determining an approximate depth of a portion of the bottomhole assembly in the wellbore, generating a data model based upon an instruction set, the data model representing flow characteristics of the fluid in the wellbore, wherein the data model is derived from the feedback signal and the approximate depth of the injection port, and analyzing the data model based upon an instruction set to extrapolate a characteristic of the formation.

19 Claims, 3 Drawing Sheets

(51) Int. Cl.
  *E21B 47/10* (2012.01)
  *G01F 1/00* (2006.01)
  *E21B 47/06* (2012.01)
  *E21B 47/09* (2012.01)

(58) Field of Classification Search
  USPC .......................................................... 703/2
  See application file for complete search history.

(56) References Cited

U.S. PATENT DOCUMENTS

| | | | |
|---|---|---|---|
| 4,243,839 | A | 1/1981 | Takahashi et al. |
| 4,754,641 | A * | 7/1988 | Orban et al. ............ E21B 21/08 |
| | | | 73/1.34 |
| 6,581,685 | B2 | 6/2003 | Burgess et al. |
| 7,272,973 | B2 | 9/2007 | Craig |
| 7,505,369 | B2 | 3/2009 | Hagedoorn |
| 7,565,834 | B2 | 7/2009 | Adnan et al. |
| 7,775,099 | B2 | 8/2010 | Bogath et al. |
| 8,616,282 | B2 | 12/2013 | Moscato et al. |
| 2004/0129418 | A1 | 7/2004 | Jee et al. |
| 2007/0068672 | A1* | 3/2007 | Jalali ................... E21B 47/1005 |
| | | | 166/250.01 |
| 2007/0095528 | A1 | 5/2007 | Ziauddin et al. |
| 2007/0289739 | A1* | 12/2007 | Cooper ................... E21B 47/10 |
| | | | 166/250.01 |
| 2008/0308272 | A1 | 12/2008 | Thomeer et al. |
| 2011/0283778 | A1 | 11/2011 | Angelescu et al. |
| 2012/0012308 | A1* | 1/2012 | Ziauddin ................. E21B 47/06 |
| | | | 166/250.1 |

OTHER PUBLICATIONS

Extrapolate_Defined (Webster's II New Riverside University Dictionary, 1988 ).*
Setari_2000 (Not on the Calculation of PWRI Well Injective Index; TAURUS Reservoir Solutions, Dec. 2000). (Year: 2000).*
International Search Report for International Application No. PCT/US2011/053636 dated Oct. 30, 2012.
Office Action received in Oman Patent Appl. No. OM/P/2014/00119 dated Jun. 7, 2018; 7 pages (with English translation).
Decision on Grant issued in Russian Patent Application No. 2014127503 dated Oct. 21, 2015; 17 pages (with English Translation).
Extended Search Report issued in European Patent Appl. No. 11181089.1 dated Jul. 3, 2017; 6 pages.

* cited by examiner

1

METHODS FOR INTERPRETATION OF DOWNHOLE FLOW MEASUREMENT DURING WELLBORE TREATMENTS

BACKGROUND

The statements in this section merely provide background information related to the present disclosure and may not constitute prior art.

The present disclosure relates generally to wellbore treatment and development of a reservoir and, in particular, to a system and a method for interpretation of downhole flow measurements during wellbore treatment.

Pumping treatments involving injection of acid or other types of fluids and chemicals are routinely conducted in oil and gas wells to enhance hydrocarbon production. The wells being treated often include a large section of perforated casing or open borehole that has variation in rock petrophysical properties. The most permeable layers of a treated section or interval of the formation often consume the majority of the treating fluid. As a result, the treatment fluid pumped into the well may not flow to the desired layers of the formation that need treatment. To achieve effective placement of treating fluid, the treatments often involve the use of diverting agents in the treating fluid, such as chemical or particulate material, to help reduce the flow into the more permeable layers that no longer need treatment and increase the flow into the lower permeability layers. Some examples of these treatments include acidizing treatment, hydraulic fracturing, water or gas shut-off, and scale or other types of damage removal treatments.

An alternative method to directly injecting treating fluid into the well is to conduct the treatment through a coiled tubing (CT), which can be positioned in the wellbore to place the fluid immediately adjacent to layers that need to be plugged when pumping a diverter, or adjacent to layers that need stimulation when pumping stimulation fluid. However, this technique is feasible if the operator knows beforehand which layers need to be treated by diverter and which layers need to be treated by stimulation fluid. In a well with a long perforated or open interval and highly non-uniform and unknown rock properties, which is typical of horizontal wells, knowledge of the flow distribution in the treated interval is desired for effective treatment.

Traditional flow measurement in a well is done through production logging using a flow sensor to measure the hydrocarbon production rate or injection rate in the wellbore as a function of depth. Production logging is commonly done after well stimulation treatment and is not suitable for providing immediate information for the on-site engineers to make real time adjustments in the treatment to optimize the job outcome. Production logging commonly uses spinner type flow meters which are not suitable for both chemical pumping treatments, and for CT operations, since it can be easily damaged or plugged by debris. A much more rugged and non-intrusive flow meter is needed for reliable application in CT operations. Additionally, for pumping treatment using coiled tubing, fluid can flow in either direction away from the injection ports located in a bottomhole assembly (BHA) attached to the end of the CT. Therefore, flow meters mounted both upstream and downstream of the injection ports are desired, sometimes referred to as differential flow (or DFLO) measurement tools. Detailed descriptions of such a tool are given in U.S. Patent Application Publication No. 2007/0289739, titled "Fluid Diversion Measurement Methods and Systems," by Cooper et al. The downhole flow measurement tool measures flow velocities. The measured velocities are then translated into mean flow velocity, from which flow rate in the well at the measurement depth is obtained by multiplying the mean velocity with known wellbore cross-sectional area for a cased wellbore, or with the aid of caliper measurement in an open hole.

Once flow rates (i.e. flow velocities) are measured using the sensor technology, the measurement data is transmitted via electrical or fiber optic wires deployed in the coiled tubing, or other telemetry means, to the surface data acquisition devices for processing by computers to display the output to the engineers supervising the treatment. While the measured flow rate or velocity itself can be useful for the engineers, other quantities derived from the measured rate coupled with downhole pressure measurement would be much more informative for diagnosis of the conditions downhole, especially the flow rate into the reservoir rock at the measurement depth.

In traditional production logging, the production rate from each formation depth interval (or rate into it in the case of injection) is determined by dividing the incremental change in the measured wellbore flow rate by the incremental depth the logging tool traverses, i.e. $q(z)=dQ/dz$, where "q" is the flow rate of fluid into the formation per unit depth, "Q" is the measured flow rate inside the wellbore, and "z" the depth. This technique is valid as long as the distribution of the flow into or out of the formation "q" does not change over the time period when logging is conducted, such as in production logging.

However, during a well treatment, especially during an acidizing treatment, the flow rate distribution into different formation layers constantly changes due to either stimulation of the formation layers to increase their flow capacity or temporary reduction in flow capacity as a result of diverting agents. Therefore, the flow rate distribution obtained from the traditional production logging can be very misleading since the flow rate into each formation layer is obtained at the time when the sensor is at that depth but may have changed when the sensor moves to a different depth. The flow rate distribution obtained this way reflects the measured rate at the sensor location as it travels in the well, rather than the actual flow rate distribution in the formation. The two are the same in the case of steady state flow (i.e. flow distribution stays constant over time), which is the case in production logging, but not in the case of typical pumping treatments where the flow profile keeps changing. Additionally, the method is also vulnerable to variations in the system parameters that may affect the measured flow rate, including pump rate fluctuation, tool rotation, and other possible causes. Therefore, modification of this technique is desirable to properly interpret the flow rate measurement during these treatments.

This disclosure proposes several methods for quantitatively characterizing a reservoir and determining the flow distribution therein from downhole flow measurements. These methods are discussed in detail below.

SUMMARY

An embodiment of a method for determining a flow distribution in a formation having a wellbore formed therein comprises the steps of: positioning a bottom hole assembly in a wellbore, the assembly including an injection port for dispensing a fluid into the wellbore, a first sensor disposed upwell from the injection port, and a second sensor disposed downwell from the injection port, wherein each of the first sensor and the second sensor generates a feedback signal representing a flow rate of the fluid in a portion of the wellbore; determining an approximate depth of a portion of the bottom hole assembly in the wellbore; generating a data model based upon an instruction set, the data model representing at least a flow characteristic of the fluid in the wellbore, wherein the data model is derived from the feedback signal and the approximate depth of the injection port; and analyzing the data model based upon an instruction set to extrapolate a characteristic of the formation.

In an embodiment, a method for determining characteristics of a formation having a wellbore formed therein comprises the steps of: deploying a coiled tubing into the wellbore, the coiled tubing having an injection port disposed therein; positioning a first sensor in the wellbore upwell from the injection port of the coiled tubing; positioning a second sensor in the wellbore downwell from the injection port of the coiled tubing; determining an approximate depth of at least one of the first sensor and the second sensor in the wellbore; injecting a fluid into the wellbore through the injection port of the coiled tubing; determining an injection rate of the fluid into the wellbore, wherein each of the first sensor and the second sensor generates a feedback signal representing a flow rate of the fluid in an interval of the wellbore; generating a data model based upon an instruction set, the data model representing flow characteristics of the fluid in the wellbore, wherein the data model is derived from the feedback signals, the approximate depth of the at least one of the first sensor and the second sensor, and the injection rate of the fluid into the wellbore; and analyzing the data model based upon an instruction set to extrapolate a characteristic of the formation.

In an embodiment, a method for determining characteristics of a formation having a wellbore formed therein comprises the steps of: positioning a bottom hole assembly in a wellbore, the assembly including an injection port for dispensing a fluid into the wellbore, a first flow sensor disposed upwell from the injection port, a second flow sensor disposed downwell from the injection port, and a pressure sensor, wherein each of the first flow sensor and the second flow sensor generates a flow signal representing a flow rate of the fluid in a portion of the wellbore and the pressure sensor generates a pressure signal representing a pressure in an annulus between the bottom hole assembly and the wellbore; determining an approximate depth of a portion of the bottom hole assembly in the wellbore; determining a reservoir pressure; generating a data model based upon an instruction set, the data model representing at least a flow characteristic of the fluid in the wellbore, wherein the data model is derived from the flow signals, the pressure signal, the approximate depth of the injection port, and the reservoir pressure; and analyzing the data model based upon an instruction set to extrapolate a characteristic of the formation.

BRIEF DESCRIPTION OF THE DRAWINGS

These and other features and advantages of the present disclosure will be better understood by reference to the following detailed description when considered in conjunction with the accompanying drawings wherein.

DETAILED DESCRIPTION

Figure 1:
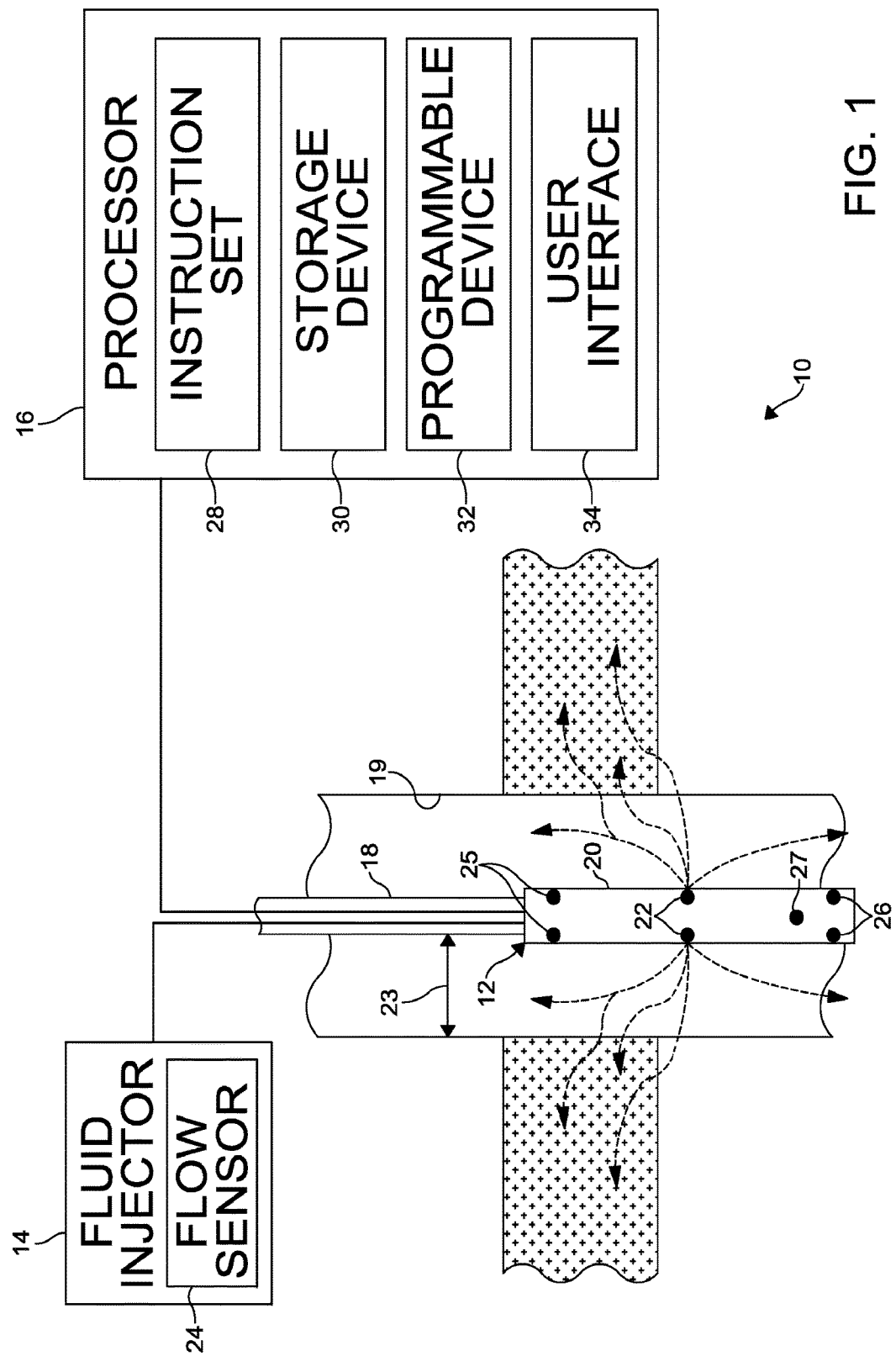
FIG. 1 is an embodiment of a schematic block diagram of a wellbore treatment system.

Referring now to FIG. 1, there is shown an embodiment of a wellbore treatment system, indicated generally at 10. As shown, the system 10 includes a bottomhole assembly (BHA) 12 in fluid communication with a fluid injector 14 and in signal communication with a processor 16. It is understood that the system 10 may include additional components.

The BHA 12 is in fluid communication with the fluid injector 14 via tubular such as a coiled tubing 18. The coiled tubing 18 allows the BHA 12 to be positioned in a wellbore formed in a formation to selectively direct a fluid to a particular depth or layer of the formation. For example, the BHA 12, the fluid injector 14, and the coiled tubing 18 cooperate to direct a diverter immediately adjacent a layer of the formation to plug the layer and minimize a permeability of the layer. As a further example, the BHA 12, the fluid injector 14, and the coiled tubing 18 cooperate to direct a stimulation fluid adjacent a layer for stimulation. It is understood that other means for directing various fluids (e.g. drilling or treatment fluids) to various depths and layers can be used, as appreciated by one skilled in the art of drilling and wellbore treatment. It is further understood that various drilling fluids, treating fluids, diverters, and stimulation fluids can be used to treat various layers of a particular formation.

In the embodiment shown, the BHA 12 includes a tubular main body 20 having an injection port 22 for directing a fluid into an annulus 23 defined by an inner diameter of a casing 19 (or inner wall) of the wellbore and an outer diameter of the main body 20 of the BHA 12 (or the coiled tubing 18). It is understood that any number of injection port(s) 22 can be used. It is further understood that the injection port 22 can have any position along the main body 20. As a non-limiting example, at least one of the fluid injector 14 and the BHA 12 is equipped with an injection flow sensor 24 to measure an injection rate of the fluid exiting the injection port 22 and flowing into the wellbore. It is understood that any sensor or device can be used to monitor the injection rate of fluid into the wellbore, as appreciated by one skilled in the art including, but not limited to, a sensor array or the like.

The BHA 12 further includes a first flow sensor 25 and a second flow sensor 26. Each of the flow sensors 25, 26 measure a velocity of a fluid that flows past the sensor surface. As a non-limiting example, the measured flow velocity is converted to a flow rate by multiply the velocity by a cross-sectional area of the annulus 23. As a non-limiting example, the BHA 12 is similar to the system disclosed in U.S. Pat. Appl. Pub. No. 2007/0289739, hereby incorporated herein by reference in its entirety. It is further understood that the flow sensors 25, 26 may comprise a sensor array.

In certain embodiments, the BHA 12 includes a pressure sensor 27 for measuring a pressure in the wellbore (e.g. a pressure in the annulus 23). It is understood that various sensors and devices for measuring a pressure in the wellbore can be used, as appreciated by one skilled in the art. It is further understood that the pressure sensor 27 may be located at any position along the main body 20 and that the pressure sensor 27 may comprise a sensor array.

The processor 16 is in data communication with the injection flow sensor 24, the flow sensors 25, 26, and the pressure sensor 27 to receive data signals (e.g. a feedback signal, a flow signal, a pressure signal) therefrom and analyze the signals based upon a pre-determined algorithm, mathematical process, or equation, for example. As shown, the processor 16 analyzes and evaluates a received data based upon an instruction set 28. The instruction set 28, which may be embodied within any computer readable medium, includes processor executable instructions for configuring the processor 16 to perform a variety of tasks and calculations. As a non-limiting example, the instruction set 28 may include a comprehensive suite of equations governing a physical phenomena of fluid flow in the formation, a fluid flow in the wellbore, a fluid/formation (e.g. rock) interaction in the case of a reactive stimulation fluid, a radial flow in a reservoir, a reservoir pressure, an Injectivity Index, and a fluid flow in a fracture and its deformation in the case of hydraulic fracturing. It is understood that any equations may be used to model a fluid flow and distribution in the wellbore and adjacent formation, as appreciated by one skilled in the art of wellbore treatment. It is further understood that the processor 16 may execute a variety of functions such as controlling various settings of the flow sensors 25, 26 and the fluid injector 14, for example.

As a non-limiting example, the processor 16 includes a storage device 30. The storage device 30 may be a single storage device or may be multiple storage devices. Furthermore, the storage device 30 may be a solid state storage system, a magnetic storage system, an optical storage system or any other suitable storage system or device. It is understood that the storage device 30 is adapted to store the instruction set 28. In certain embodiments, data retrieved from the flow sensors 25, 26 is stored in the storage device 30 such as a temperature measurement and a pressure measurement, and a history of previous measurements and calculations, for example. Other data and information may be stored in the storage device 30 such as the parameters calculated by the processor 16, a database of petrophysical and mechanical properties of various formations, a database of natural fractures of a particular formation, data tables used in reservoir characterization in various drilling operations, and a data used to determine a reservoir pressure, for example. It is further understood that certain known parameters and numerical models for various formations and fluids may be stored in the storage device 30 to be retrieved by the processor 16.

As a further non-limiting example, the processor 16 includes a programmable device or component 32. It is understood that the programmable device or component 32 may be in communication with any other component of the system 10 such as the fluid injector 14 and the flow sensors 25, 26, for example. In certain embodiments, the programmable component 32 is adapted to manage and control processing functions of the processor 16. Specifically, the programmable component 32 is adapted to control the analysis of the data signals (e.g. feedback signal generated by each of the sensors 24, 25, 26, 27) received by the processor 16. It is understood that the programmable component 32 may be adapted to store data and information in the storage device 30, and retrieve data and information from the storage device 30.

In certain embodiments, a user interface 34 is in communication, either directly or indirectly, with at least one of the fluid injector 14, the flow sensors 25, 26, and the processor 16 to allow a user to selectively interact therewith. As a non-limiting example, the user interface 34 is a human-machine interface allowing a user to selectively and manually modify parameters of a computational model generated by the processor 16.

In use, the coiled tubing 18 is moved along a length of the wellbore while a treating fluid is pumped into the coiled tubing 18 and through the injection port 22. The fluid leaving the injection port 22 travels into the annulus 23. The fluid in the annulus 23 flows both upwell and downwell in the wellbore and enters the formation layers that accept fluid. A split of the upwell and downwell flow rate depends both on a position of the BHA 12 and the properties of the formation layers surrounding the BHA 12. For example, when the BHA 12 is positioned upwell from a permeable layer of the formation, a majority of the fluid exiting the injection port 22 flows downwell. As a result, the first flow sensor 25 registers substantially zero flow rate, while the second flow sensor 26 registers a flow rate that is substantially equal to the injection rate. Similarly, when the BHA 12 moves to the bottom of the well so that all permeable layers are upwell from the BHA 12, the first flow sensor 25 registers a full injection rate and second flow sensor 26 registers substantially zero flow rate.

As a further non-limiting example, the BHA 12 is in a stationary position relative to the formation. As such, if the first flow sensor 25 registers an increase in a flow rate and the second flow sensor 26 registers a decrease in a flow rate, it can be assumed that the injected fluid is diverted from the zones of the formation downwell relative to the BHA 12 to the zones upwell relative to the BHA 12. Conversely, if the first flow sensor 24 registers a decrease in a flow rate and the second flow sensor 26 registers an increase in a flow rate, it can be assumed that the injected fluid is diverted from the zones of the formation upwell relative to the BHA 12 to the zones downwell relative to the BHA 12.

In a more complex reservoir containing many permeable layers, more detailed understanding of the flow distribution into various layers of the formation is needed in order to pinpoint the zones to receive the injected fluid. For this purpose, it is desirable to determine the flow profile into the reservoir across an entire reservoir interval.

In certain embodiments, a direct computation of the flow rate into the reservoir per unit length of the wellbore can be obtained by the following equation, where "q" is the reservoir inflow rate, "$Q_{inj}$" is the injection rate of the fluid registered by the injection flow sensor 24, "$Q_{up}$" is a flow rate registered by the first flow sensor 25, "$Q_{up}$" is counted positively when the flow registered by the first flow sensor 25 is in the upwards direction, "$Q_{down}$" is a flow rate registered by the second flow sensor 26, "$Q_{down}$" is counted positively when the flow registered by the first flow sensor 26 is in the downwards direction, and "$\Delta l$" is the spacing distance between the first flow sensor 25 and the second flow sensor 26:

$$q = \frac{Q_{inj} - Q_{up} - Q_{down}}{\Delta l}$$

An alternative method for determining the reservoir inflow rate (q) includes the derivative of the measured downhole rates ($Q_{up}$, and $Q_{down}$) with respect to depth while the BHA 12 is moving in the wellbore. As the BHA 12 traverses a formation interval that accepts fluid, the flow rates ($Q_{up}$, and $Q_{down}$) as measured by the sensors 25, 26 change (e.g. $Q_{up}$ increases and $Q_{down}$ decreases as BHA 12 travels downwell, while the opposite is true when the BHA 12 travels upwell). The rate into the formation (q) can be estimated as $q(z_{up}(t),t) \approx dQ_{up}/dz$, or $q(z_{down}(t),t) \approx dQ$- down/dz, where "zup(t)" and "zdown(t)" are the corresponding depths of the sensors 25, 26.

The above equations provide an estimate of the flow rate (q) into the formation at the current sensor depths. The user can plot "q" vs. depth to extrapolate characteristics of the formation such as a fluid in-flow to various formation layers. As a non-limiting example, a flow profile is the flow rate distribution into the formation (i.e. q(z,t) vs. z) at any given instant.

A modified equation using normalized flow rate is also disclosed herein. The modified equation is effective to partially compensate for data fluctuation caused by factors that affect both upper and lower sensors the same way, e.g. by pump rate fluctuation, tool rotation, or sensor miscalibration caused by abnormal treating fluid/sensor interaction. The modified equation is given below:

$$q \approx \left(\frac{1}{2\Delta l}\right)\left(\sqrt{1 + 4\frac{d}{dz}\left(\frac{Q_{up}}{Q_{up} + Q_{down}}\right)\Delta l} - 1\right)Q_{inj}$$

Figure 2:
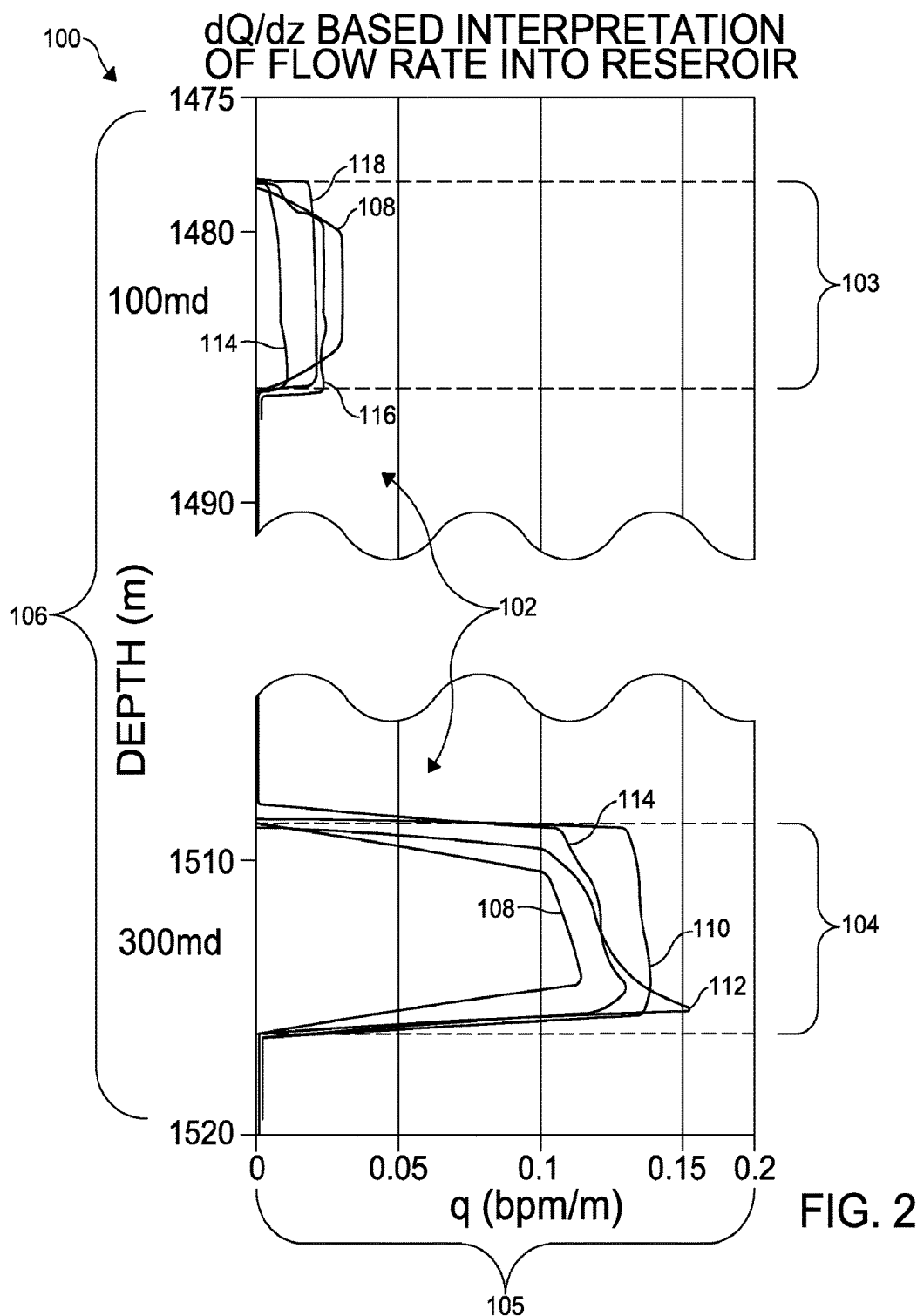
FIG. 2 is a fragmentary graphical representation of an interpretation of a function of an inflow rate with respect to a depth of a formation during a wellbore treatment.

As an illustrative example, FIG. 2 includes a graphical plot 100 showing a data model 102 (i.e. interpretation of dQ/dz). As shown, the X-axis 105 of the graphical plot 100 represents a reservoir inflow rate (q) and the Z-axis 106 of the graphical plot 100 represents a depth of the formation, measured from a pre-determined surface level. As a non-limiting example, the processor 16 analyzes the data model 102 based upon the instruction set 28 to characterize the formation including a flow distribution of the injected fluid.

As a non-limiting example, the data model represents an acid stimulation of a reservoir containing two permeable carbonate layers 103, 104 having different permeability and depth. It is understood that a numerical simulator can be used to simulate acid reaction with the layers 103, 104, the associated wormhole growth, and a skin evolution. As a further non-limiting example, the acid stimulation treatment includes the following treatment stages: a first pass 108 includes the BHA 12 traveling from a "top" of the reservoir to a "bottom" of the reservoir, injecting water; a second pass 110 includes the BHA 12 traveling upwell across the layer 104, pumping acid; a third pass 112 includes the BHA 12 traveling downwell across the layer 104, pumping diverter; a fourth pass 114 includes the BHA 12 traveling upwell across the layer 104, pumping diverter, and then across the layer 103, pumping acid; a fifth pass 116 includes the BHA 12 traveling downwell across the layer 103, pumping acid; a sixth pass 118 includes the BHA 12 traveling upwell across the layer 103, pumping acid. It can be extrapolated from the graphical plot 100 that a majority of the injected fluid flows into the layer 104, therefore the layer 104 has a greater formation permeability than the layer 103. However, the inflow rates into the layers 103, 104 do not exhibit a substantial change during the various passes 108, 110, 112, 114, 116, 118 of the treatment, since the total injection rate is kept constant.

In certain embodiments, before a stimulation treatment starts, a baseline inflow profile can be obtained by injecting water into the wellbore to obtain an understanding of which layers of the formation are most permeable and are potential "thief zones" that may require spotting diverter across them during the treatment. During or after a treatment, another water injection cycle can be conducted to obtain the inflow profile as a result of stimulation. The water injection cycles can provide a means of assessing whether a target zone has been successfully stimulated by comparing the post stimulation flow profile with the pre-stimulation profile.

However, it is understood that frequent water injection cycles during a stimulation treatment increases job time and cost. It would be beneficial if one could use the interpreted inflow rate during the stimulation, even if the injected fluid is reactive and causes the flow profile to change. This can be accomplished using the Injectivity Index (J), an equation for which is shown below:

$$J = \frac{q(z(t), t)}{p_w(t) - p_r}$$

In the equation above, "q(z(t),t)" is the derived inflow rate into the reservoir at a depth "z(t)" of one of the flow sensors 25, 26 at the current time, "$p_w(t)$" is the pressure in the annulus 23 measured by the pressure sensor 27, and "$p_r$" is the reservoir pressure which is estimated based on known information relating to the formation, as appreciated by one skilled in the art, including those in horizontal well text books such as, but not limited to S. D. Joshi, "Horizontal Well Technology", PennWell Books, PennWell Publishing Company, Tulsa, Oklahoma, 1991. The Injectivity Index (J) quantifies the ability to inject into a given formation or layer of a particular formation. The Injectivity Index (J) is related to other formation properties via following well known equation for radial flow in a reservoir:

$$J = \frac{kh}{141.2B\mu[0.5(\ln t_D + 0.8091) + S]}$$

In the radial flow equation above, "k" is the formation permeability, "h" is the permeable zone height, "$\mu$" is reservoir fluid viscosity, "$t_D$" is a dimensionless time, "B" is the formation volume factor, and "S" is the damage skin. Accordingly, the higher the reservoir fluid mobility (kh/μ), and the lower the damage skin (S), the greater the Injectivity Index (J).

During a stimulation treatment, the reservoir fluid mobility (kh/μ) does not change. Only the skin (S) is changed, either as a result of the stimulation fluid removing the damage and lowering the skin (S), or diverter temporarily increasing the skin (S) to reduce the inflow into the permeable zone. Therefore, the advantage of using the Injectivity Index (J) for stimulation interpretation is that it reflects the skin (S) change as a result of stimulation or diversion. It is much more revealing than the measured inflow rate itself. For example, when pumping at a constant rate through the coiled tubing 18 and injection port 22 in an acid stimulation, the measured inflow rate into the reservoir may not change during the stimulation, but the Injectivity Index (J) will continue to increase, indicating removal of skin (S). During the stimulation, the derived inflow rate from the measured wellbore rate may go up or down depending on the change of skin (S) in different layers and a flow redistribution among the layers as a result of the changes to skin (S). For a given layer, however, the Injectivity Index (J) should continue to increase if the stimulation is taking effect, or conversely, the Injectivity Index (J) should decrease if a diverter is used. Therefore, the effectiveness of stimulation or diversion can be determined from the changes in Injectivity Index (J) from multiple passes of the BHA 12 through the same reservoir depth.

Figure 3:
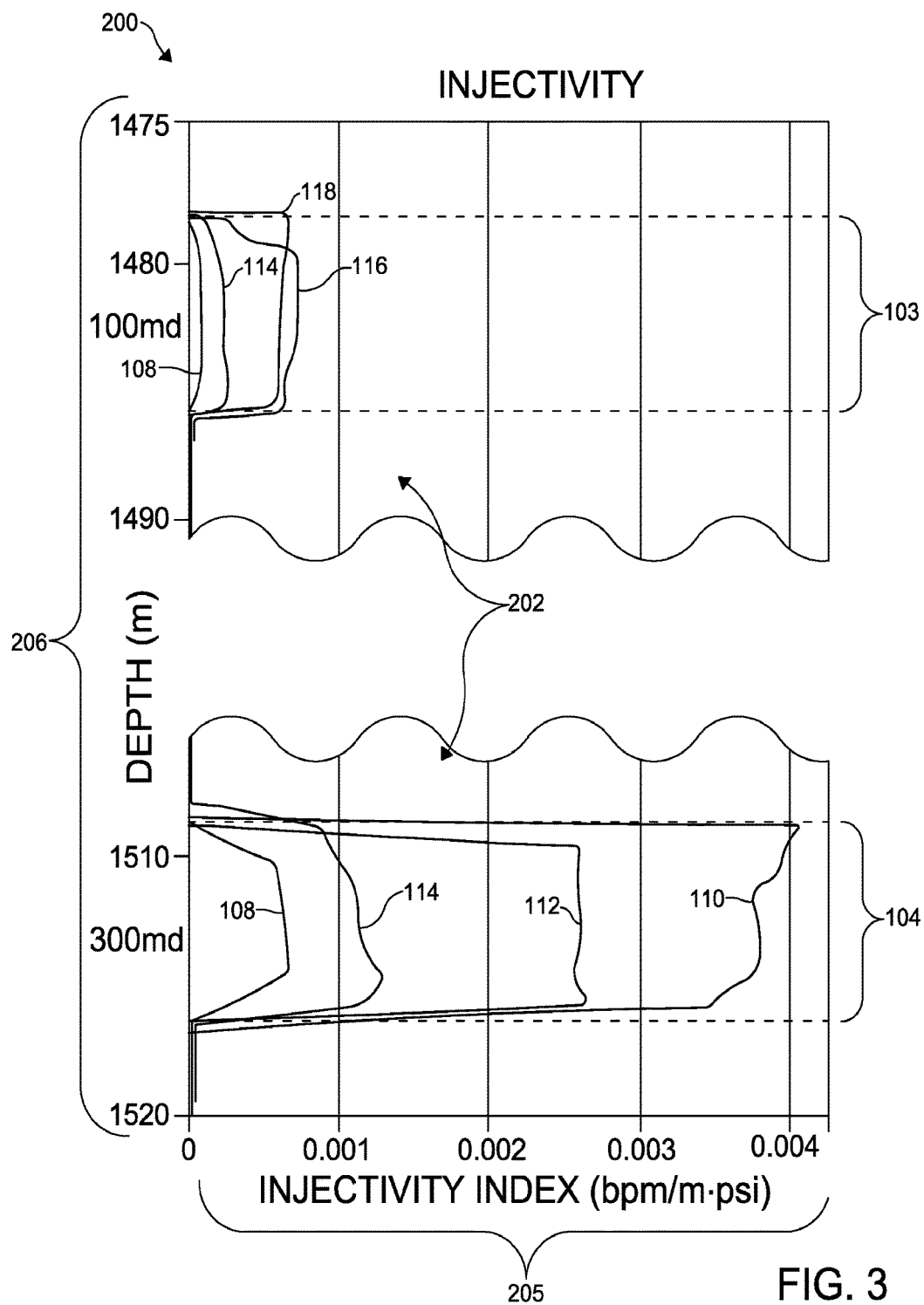
FIG. 3 is a fragmentary graphical representation of an interpretation of an Injectivity Index of the formation of FIG. 1 during the wellbore treatment of FIG. 2.

As a comparative example, FIG. 3 includes a graphical plot 200 showing a data model 202 (i.e. interpretation of Injectivity Index (J)) based upon an analysis of the data signals received by the processor 16. As shown, the X-axis 205 of the graphical plot 200 represents the Injectivity Index (J) and the Y-axis 206 of the graphical plot 200 represents a depth of the formation, measured from a pre-determined surface level. As a non-limiting example, the processor 16 analyzes the data model 202 based upon the instruction set 28 to characterize the formation including a flow distribution of the injected fluid.

As a non-limiting example, the data model represents an acid stimulation of the reservoir containing two permeable carbonate layers 103, 104, as illustrated in FIG. 2. For comparison, the acid stimulation treatment includes the same treatment stages as illustrated in FIG. 2. By comparing the graphical plot 100 and the graphical plot 200 one can extrapolate that the Injectivity Index (J) of the layer 104 increases significantly after the pass 110 (the first acid pass for layer 104), and then reduces significantly after the passes 112, 114 (diverter passes for layer 104), indicating effective stimulation and diversion of the layer 104. For the layer 103, the pass 114 (the first acid pass for layer 103) indicates the Injectivity Index (J) increases only by a small amount compared to the initial water injection pass 108. Only after the pass 116 (the second acid pass for layer 103) does the Injectivity Index (J) increase drastically, indicating effective stimulation. In the pass 118, there is minimal increase in the Injectivity Index (J), indicating the layer 103 has already been effectively stimulated and further improvement is minimal.

The above example illustrates a benefit of using the interpreted Injectivity Index (J) and its change over multiple passes 108, 110, 112, 114, 116, 118 of the BHA 12 to extrapolate the downhole flow condition and any changes thereof during the stimulation. It is understood that the extrapolated information can be used to make realtime decisions to properly position the BHA 12 to maximize the treatment effectiveness.

In addition to the Injectivity Index (J) that is derived from the analysis of the data signals received by the processor 16, one can further compute the skin (S) using the skin equation given above to further quantify the stimulation effectiveness.

The system 10 and methods described herein provide a means to characterize a reservoir in various treatment operations. Using continuous and substantially real-time flow tracking, in addition to other measurements (both surface and downhole), the system 10 can extrapolate reservoir properties.

The preceding description has been presented with reference to embodiments of the present disclosure. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining to the precise structures described and shown in the accompanying drawings, but rather should be read as consistent with and as support for the following claims, which are to have their fullest and fairest scope.

We claim:

1. A method for determining a downhole flow condition in a formation having a wellbore formed therein, comprising the steps of:

positioning a bottomhole assembly in the wellbore, the bottomhole assembly including an injection port for dispensing a fluid into the wellbore, a first sensor disposed upwell from the injection port, and a second sensor disposed downwell from the injection port, wherein each of the first sensor and the second sensor generates a feedback signal representing a flow rate of the fluid in a portion of the wellbore;

performing multiple passes with the bottomhole assembly within the wellbore and dispensing a fluid during each of the passes, wherein at least one of the passes comprises dispensing a treatment fluid from the injection port into the formation via the wellbore;

determining an approximate depth of a portion of the bottomhole assembly in the wellbore;

generating a data model based upon an instruction set that includes a formula for determining an Injectivity Index, the data model representing at least a flow characteristic of the dispensed fluid into the formation, wherein the data model is derived from the feedback signals and the determined approximate depth of the injection port, and wherein the data model compensates for data fluctuation affecting the feedback signals representing the flow rate of the fluid generated by the first and second sensors to normalize the flow characteristic; and analyzing the data model to extrapolate a downhole flow condition of the formation based at least in part one or more changes in the Injectivity Index between one or more multiple passes, and to determine an effectiveness of the treatment fluid based at least in part on the extrapolation.

2. The method according to claim 1 further comprising providing a pressure sensor to measure a pressure in the wellbore, wherein the data model is further derived from the measured wellbore pressure.

3. The method according to claim 2, wherein the pressure sensor is integrated with the bottomhole assembly.

4. The method according to claim 1 further comprising determining a reservoir pressure, wherein the data model is derived from the determined reservoir pressure.

5. The method according to claim 1 wherein the first sensor and the second sensor are spaced apart by a predetermined distance and the data model is derived from the predetermined distance.

6. The method according to claim 1 wherein the instruction set includes a formula for determining a radial flow in a reservoir.

7. The method according to claim 1 wherein the downhole flow condition of the formation that is extrapolated is at least one of a flow profile, a permeability, a permeable zone length, a fluid viscosity, and a skin damage.

8. A method for determining downhole flow condition of a formation having a wellbore formed therein, comprising the steps of:

deploying a coiled tubing into the wellbore, the coiled tubing having an injection port disposed therein;

positioning a first sensor in the wellbore upwell from the injection port of the coiled tubing;

positioning a second sensor in the wellbore downwell from the injection port of the coiled tubing;

determining an approximate depth of at least one of the first sensor and the second sensor in the wellbore;

performing multiple passes with the coiled tubing within the wellbore and injecting a fluid during each of the passes, wherein at least one of the passes comprises injecting a treatment fluid into the formation via the wellbore through the injection port of the coiled tubing;

determining an injection rate of the fluid into the formation, wherein each of the first sensor and the second sensor generates a feedback signal representing a flow rate of the fluid in an interval of the wellbore, and wherein the injection rate of the fluid is normalized to compensate for data fluctuation affecting the first and second sensors;

generating a data model based upon an instruction set that includes a formula for determining an Injectivity Index, the data model representing flow characteristics of the injected fluid in the wellbore, wherein the data model is derived from the feedback signals, the determined approximate depth of the at least one of the first sensor and the second sensor, and the determined injection rate of the fluid into the wellbore; and analyzing the data model to extrapolate a downhole flow condition of the formation based at least in part one or more changes in the Injectivity Index between one or more multiple passes; and determining an effectiveness of the treatment fluid from the analyzed data model based at least in part on the extrapolation.

9. The method according to claim 8 further comprising providing a pressure sensor to measure a pressure in the wellbore, wherein the data model is further derived from the measured wellbore pressure.

10. The method according to claim 9 wherein the pressure sensor is integrated with the coiled tubing.

11. The method according to claim 8 further comprising determining a reservoir pressure, wherein the data model is further derived from the determined reservoir pressure.

12. The method according to claim 8 wherein the first sensor and the second sensor are spaced apart by a predetermined distance and the data model is derived from the predetermined distance.

13. The method according to claim 8 wherein the instruction set includes at least one of a formula for determining a radial flow in a reservoir.

14. The method according to claim 8 wherein the downhole flow condition of the formation that is extrapolated is at least one of a flow profile, a permeability, a permeable zone length, a fluid viscosity, and a skin damage.

15. The method according to claim 8 wherein at least one of the passes comprises injecting a stimulation fluid and at least one of the passes comprises injecting a diverter and wherein determining comprises quantifying an effectiveness of the stimulation fluid or the diverter.

16. A method for determining a downhole flow condition of a formation having a wellbore formed therein, comprising the steps of:

positioning a bottomhole assembly in a wellbore, the bottomhole assembly including an injection port for dispensing a fluid into the wellbore, a first flow sensor disposed upwell from the injection port, a second flow sensor disposed downwell from the injection port, and a pressure sensor, wherein each of the first flow sensor and the second flow sensor generates a flow signal representing a flow rate of the fluid in a portion of the wellbore and the pressure sensor generates a pressure signal representing a pressure in an annulus between the bottomhole assembly and the wellbore, wherein positioning comprises performing multiple passes with the bottomhole assembly within the wellbore and dispensing a fluid during each of the passes;

determining an approximate depth of a portion of the bottomhole assembly in the wellbore;

determining a reservoir pressure;

determining an injection rate of the fluid into the formation;

generating a data model based upon an instruction set and derived from the injection rate, wherein the instruction set comprises a formula for determining an Injectivity Index, the data model representing at least a flow characteristic of the fluid in the wellbore, wherein the data model is derived from the flow signals, the pressure signal, the determined approximate depth of the injection port, the determined reservoir pressure, and the determined injection rate and wherein the data model compensates for data fluctuation affecting the flow signals representing the flow rate of the fluid generated by the first and second flow sensors to normalize the flow characteristic; and analyzing the data model to extrapolate a downhole flow condition of the formation based at least in part one or more changes in the Injectivity Index between one or more multiple passes.

17. The method according to claim 16 wherein the first flow sensor and the second flow sensor are spaced apart by a predetermined distance and the data model is derived from the predetermined distance.

18. The method according to claim 16 wherein the instruction set includes at least one of a formula for determining a radial flow in a reservoir.

19. The method according to claim 16 wherein the downhole flow condition of the formation that is extrapolated is at least one of a flow profile, a permeability, a permeable zone length, a fluid viscosity, and a skin damage.

* * * * *